Feb. 1, 1949.  F. H. HAGNER  2,460,346
STAR MATCHER AND SUN COMPASS
Filed Dec. 8, 1944  3 Sheets-Sheet 2

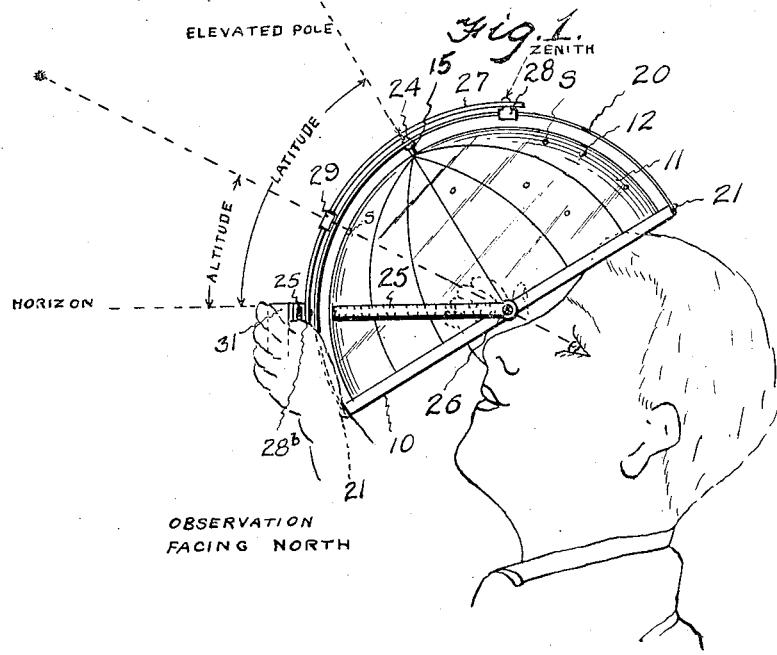
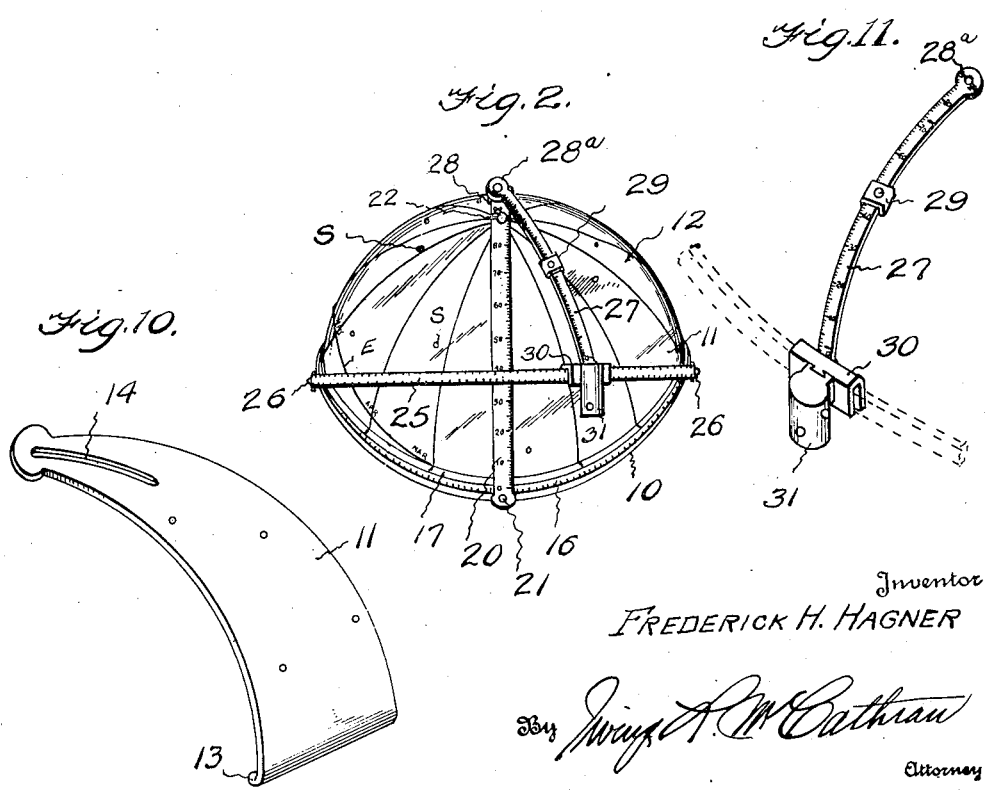

Inventor
FREDERICK H. HAGNER

Feb. 1, 1949.     F. H. HAGNER     2,460,346
STAR MATCHER AND SUN COMPASS
Filed Dec. 8, 1944     3 Sheets—Sheet 3
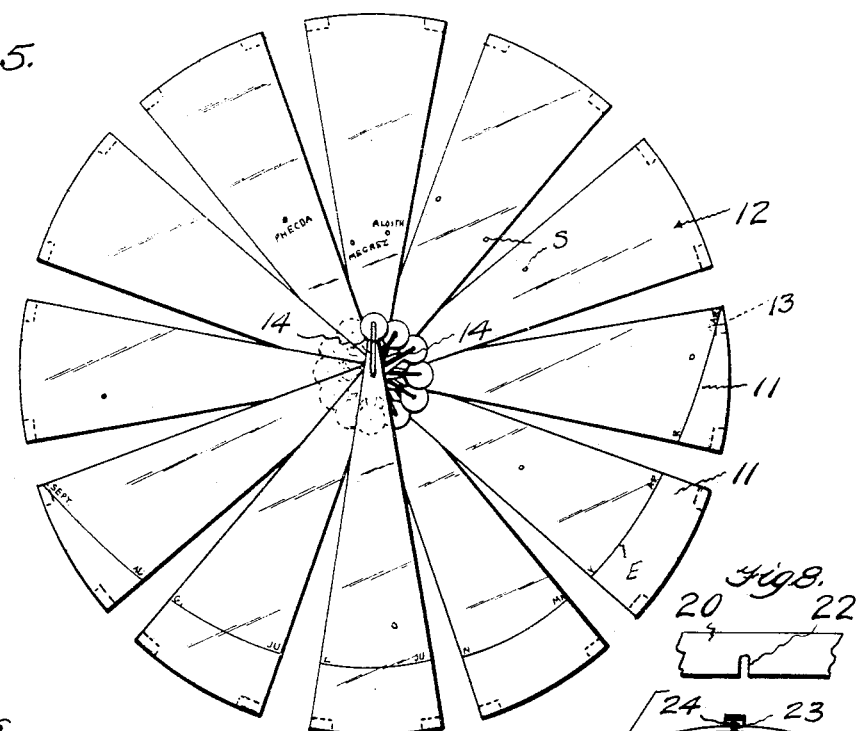
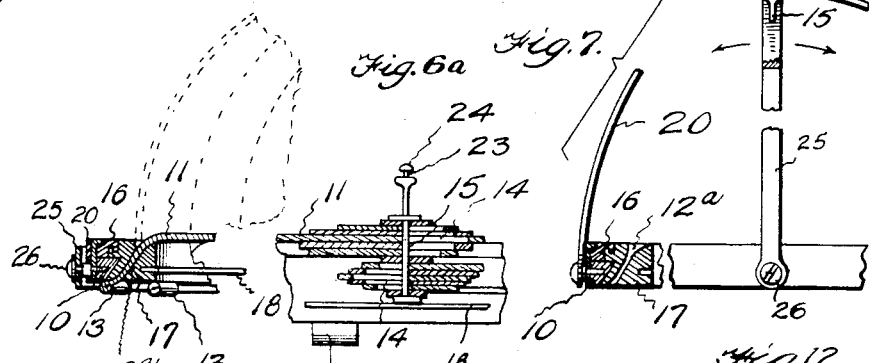
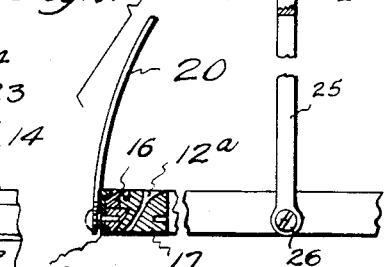
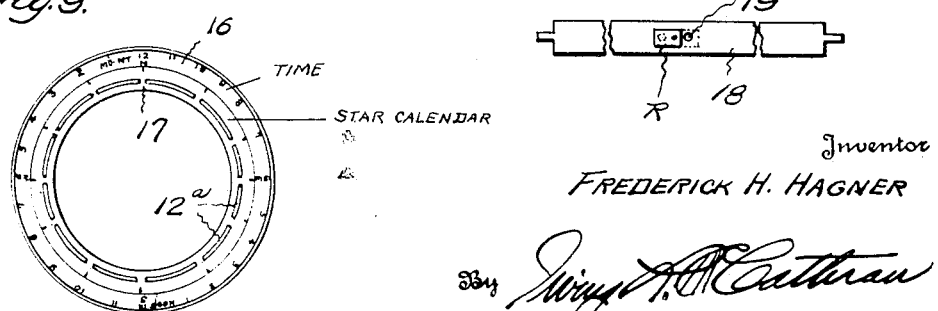
Inventor
FREDERICK H. HAGNER Patented Feb. 1, 1949

2,460,346

UNITED STATES PATENT OFFICE 2,460,346

STAR MATCHER AND SUN COMPASS

Frederick H. Hagner, San Antonio, Tex.

Application December 8, 1944, Serial No. 567,234

11 Claims. (Cl. 33—61)

This invention relates to a star matcher and sun compass, and has for one of its objects the production of a simple and efficient means for determining direction and approximate latitude and local time day or night, without the necessity of referring to other equipment or tables, simply by matching the navigational stars with their indicated positions upon the dome of the device while viewing these stars through the dome.

A further object of this invention is the production of a simple and efficient star matcher and sun compass having a collapsible dome which may be collapsed to fit substantially flat relative to the supporting ring, and may be pulled to an extended operative position when it is desired to operate the device.

Another object of this invention is the production of a simple and efficient instrument having a time scale and a star calendar associated with a star matching dome and an observer's meridian arc, a horizon arc and an altitude and polar distance arc for facilitating the measuring of the angle of an observed celestial body or other object relative to the position of the observer and the azimuth bearing.

A still further object of this invention is the production of an instrument for determining north and south in a manner whereby a ray of light from a selected celestial body cast upon a selected point of reference will indicate that the instrument is oriented to the true celestial north and south points when the instrument is level and set for the proper date and the observer's latitude.

Other objects and advantages of the present invention will appear throughout the following specification and claims.

In the drawings:

Figure 1 is a side elevational view of the device when in use;

Figure 2 is a front view;

Figure 5 is a top plan view of the segments assembled which form the collapsible dome showing the segments in a collapsed position;

Figure 6 is a fragmentary sectional view of the device in a collapsed position;

Figure 6a is an exaggerated fragmentary sectional view illustrating the relative positions of the segments and sighting strip, when the segments are in a collapsed position;

Figure 7 is a fragmentary sectional view of the supporting ring and also showing the horizon arc and observer's meridian arc;

Figure 8 is a fragmentary top plan view of that portion of the observer's meridian arc having the notch into which the anchoring knob of the connecting pin for the segments of the collapsible dome is suspended;

Figure 9 is a diagram of the time scale and star calendar distorted as to actual proportional size for the purpose of illustrating the scale and calendar;

Figure 10 is a perspective view of one of the dome segments;

Figure 11 is a perspective view of the altitude and polar distance arc;

Figure 12 is a plan view of the sighting strip.

Figure 3:
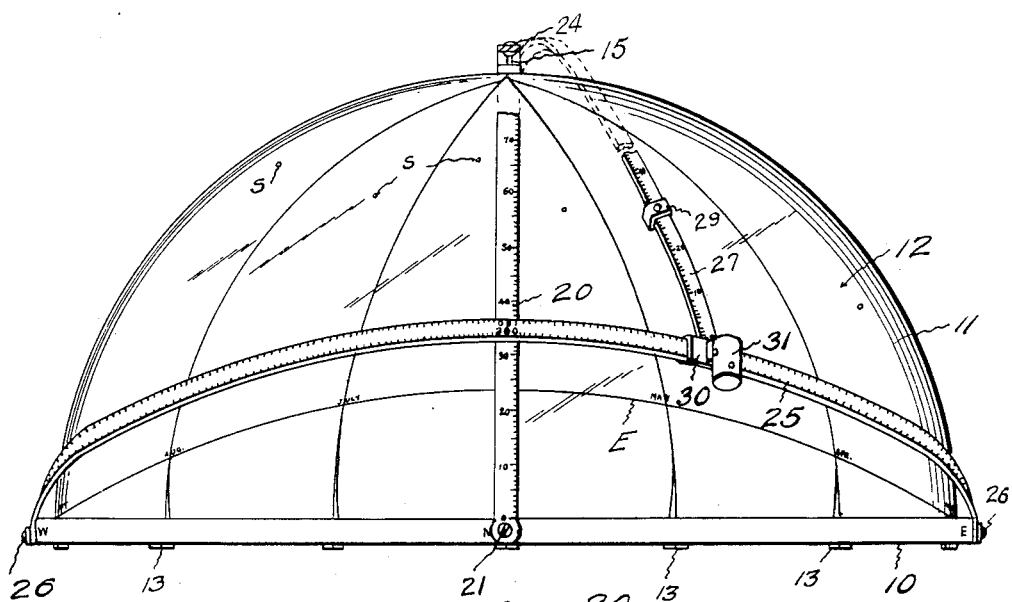
Figure 3 is an enlarged front view with certain parts in section.
Figure 4:
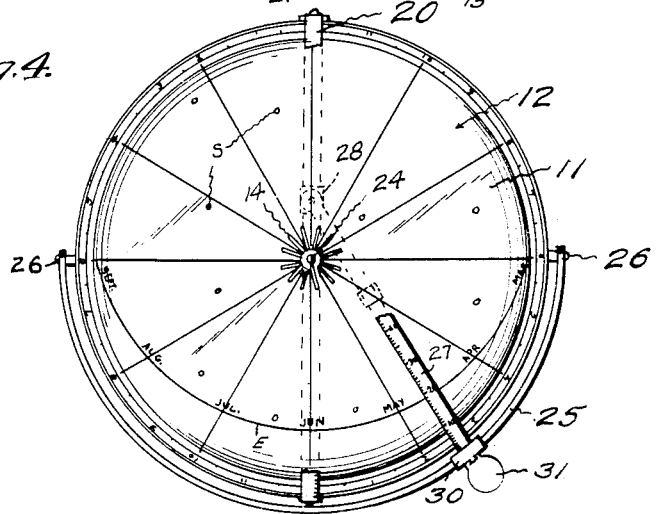
Figure 4 is a top plan view with certain parts broken away.

By referring to the drawings, it will be seen that 10 designates the supporting ring which carries the rings 16 and 17. These rings 16 and 17 are secured by an overhanging tongue-and-groove connection of any desired type to permit the ring 16 to rotate relative to the ring 17. The segments 11 form the collapsible dome 12. The segments 11 are normally arched when in an extended position and are threaded through the slots 12a of the ring 17, as shown in Figure 6. Beads 13 are provided at the lower ends of the segments 11 to provide stops and to limit the upward movement of the segments when they are pulled to an extended position. The inner ends of the segments 11 overlap and are slotted as at 14, for receiving the connecting and anchoring pin 15 which pin secures the inner ends of the segments together. These slots 14 permit the inner ends of the segments to slide one over the other when the segments are collapsed and lie in a substantially flat position. The segments are formed of transparent flexible material such as transparent plastic of such a character that the segments will lie flat when collapsed and will take the form of a dome when extended as shown in Figures 1, 2, 3 and 4.

The relative locations of the navigational stars are marked on the dome 12, as at S, so that these stars may be matched with the navigational stars in the heavens when viewed through the transparent dome 12 by an observer, as shown in Figure 1. These locations are preferably designated by apertures formed in the segments of the dome which apertures are surrounded by luminous rings or linings in the same manner as illustrated and described in my application filed April 26, 1943, Serial Number 484,639, relating to Star identifier, which became Patent No. 2,372,487, issued March 27, 1945. The ecliptic line E is also indicated upon the globe 12.

The supporting ring 10 carries a pair of rotatable rings 16 and 17, the ring 16 being the time scale and the ring 17 being the star calendar. The time scale is marked with the hours of the day from 12 noon to midnight and midnight to 12 noon, to cover the 24 hr. period. Midnight and noon may be considered the zero points. The star calendar is marked in 12 divisions designating 12 months of the year from January through December, the zero point being between January and December. This scale is shown in Figure 9. A sighting strip 18 is carried by the inner face of the supporting ring 17 and spans the diameter thereof. A sighting aperture 19 is provided in the center of the strip 18 so that an observer may sight a selected star or celestial body therethrough in the manner as described in the following. As shown in the exaggerated view in Figure 6ª the sighting strip 18 is adapted to lie flat and the segments 12 are of sufficient thinness to permit the segments to collapse without interfering therewith, and the parts are exaggerated as to size to facilitate illustration.

An observer's meridian arc 20 is pivoted at each end to the edge of the ring 10 by pins 21, and is adapted to swing over the top of the dome 12 when the dome is extended in the manner as shown in Figures 1, 2, 3 and 4, and extends across the pole of the dome. The arc 20 is provided upon one side at a central point intermediate its ends with a notch 22 into which fits the neck portion 23 of the knob 24 of the pin 15 for supporting the pole of the dome 12, thereby holding the dome in an extended position.

A horizon arc 25 is pivoted to the edge of the ring 10, as at 26, and at right angles to the pivot pins 21 of the arc 20. The horizon arc 25 is provided with a scale adjacent each edge, one scale being 0 at its center and being graduated to 90 degrees toward one end and 270 degrees toward the other end. The scale on its opposite edge is marked 180 degrees at its center and is graduated to 90 degrees at one end and at its opposite end to 270 degrees, so that the arc 25 may be used upon the opposite side of the dome to that shown in Figure 1.

The transparent altitude and polar distance arc 27 is pivoted at one end to an anchoring slide 28, as at 28ª, which slide 28 is slidable along the length of the arc 20 and is so constructed as to pass over the knob 24 when the dome is extended, the arc 20 being formed to transparent yieldable material, it will also flex sufficiently for this purpose. The slide 28 may move to a position where the arc 27 may be used in a reverse position from that shown in Figure 1 when observing the opposite side of the dome 12. A transparent index slide 29 which carries a lens is slidable along the arc 27 to a position to be in line with a selected celestial body and the actual location of the body to be matched. When these are in alignment with the eye of an observer, the angle of the celestial body relative to the artificial horizon on the edge of the arc 25 may be measured in the manner shown in Figure 1. The arc 27 is graduated from 0 at its base to 90 degrees at a point directly over the pivot 28ª. The base of the arc 27 is pivoted, as at 28ᵇ, to the inverted U-shaped shoe 30 which is slidable around the upper edge of the horizon arc 25. A leveling device 31 of a suitable type is suspended from the shoe 30 as shown, and is adapted to be gripped by one hand of the operator to facilitate keeping the ring 25 approximately in a level position. The edge of the ring 10 is gripped by the opposite hand and the dome 12 is steadied or braced at its base by the fingers, as shown. The leveling device 31 is removable.

The names of the navigational stars are placed near the representations of these stars upon the dome, and the months are indicated adjacent the ecliptic line. Other data may be placed upon the dome 12, if desired.

When using the device to determine latitude, the dome 12 is held in the position shown in Figure 1. The observer by viewing the navigational stars will then match these stars with the designations upon the dome. The matching of the stars with the indication of the stars positions on the dome will cause an observer to face north, and the observer's meridian arc 20 is then in a true north-and-south line. This orients the observer and the observer then moves the horizon arc 25 until the touch-sensitive level indicates that the arc 25 is in a horizontal plane and level. The arc 25 is then held in this lever position directly in front of the observer's meridian arc 20. The observer then selects a matched star which is either in alignment with the arc 20 or is approaching the observer's meridian represented by arc 20. When the star is exactly on his meridian and the horizon arc 25 is level, the observer reads the angle opposite the horizon line on the observer's meridian arc 20 and therby obtains his latitude. This gives the observer an opportunity to determine his latitude from each star as it crosses his meridian while still facing north. The ring 17 is rotated to bring the date July 1 opposite to, or in registration with, the mark designating midnight on the scale 16, because Vega is on the meridian on July 1 at midnite. Hence, the observer measures the altitude of Vega at the time it is on the meridian at midnight, thereby determining the observer's latitude. The observer then has his latitude and direction. The observer measures the time and date since the dome is carried by the star calendar ring which rotates with the dome and rotates with the time scale ring. For example Vega will be on the meridian on July 1 at midnight, that is, the arc 20 will be opposite the mark July 1 on the star calendar and 12 midnight on the time scale.

When the device is used as a sun compass, the instrument is placed flat upon a support in a level position. The leveling device is disconnected from the arc 27 and the leveling device may be placed upon the support to ascertain whether or not the support is level. The sight 29 is brought to a position at the base of the arc 27 which is marked zero on the scale of this arc 27 adjacent the shoe 30, if the sun is in zero declination which would be determined by the date on the ecliptic. The shoe 28 is slid along the arc 20 toward the north to bring the pivot of the arc 27 to the point on the scale of the arc 20 which indicates the observer's known latitude, and the distance from the zero point at the base of arc 27 will give the polar distance of the sun for the date of observation. This correct angle is taken from the ecliptic E on the dome.

The instrument is then rotated and the arc 27 is rotated around the pivot 28 until the lens in the sight 29 casts a sun spot upon the reference plate R on the sighting strip 18 at the center of the dome. Then the observer knows his true north and south points and the azimuth band 25 represents all other directions because the base of the arc 27 where it joint the arc 25 points north and the balance of the scale indicates all other directions.

A compass of a conventional type may be checked by placing the instrument above the compass with the sighting aperture 19 directly over the center of the compas card, so that the sun spot will strike the plate R over the sighting aperture 19.

When the arc 27 is in a position to bring the lens in the sight 29 directly over arc 20, the sun spot should appear cast upon the plate R which is swung to a closed position over the aperture 19. If this does not happen it is an indication that the observer has set the incorrect latitude upon the arc 20 of the instrument. He then moves the pivot 28 until the sun spot is properly centered on plate R and then he reads his correct latitude on arc 20. This tells the observer it is 12 o'clock noon and the sun has reached its highest point on that day.

When the sun is in south declination, a dome having the ecliptic representing the sun's angular position while in south declination is used. When the sun is in north declination a dome having the ecliptic representing the sun's angular position while in north declination is used.

The instrument above described may be used in identically the same manner as set forth in connection with its use upon a compass, by placing the instrument in the center of a raft, life-boat, and the like, so that the sun's point will pass through the transparent dome and strike a central reference point under the dome on the instrument, which central point will be directly over a line drawn fore and aft on the craft.

What is claimed as new is:

1. An instrument of the class described comprising a transparent dome-like member, a base for said dome-like member, said dome-like member being rotatably mounted upon said base, a time scale rotatably mounted relative to said dome-like member, an observer's meridian arc pivoted to said base and movable to a position overlying said dome-like member, a horizon and azimuth arc pivoted to the base at right-angles to the observer's meridian arc and movable to selected positions over the face of the dome-like member, and an altitude and polar distance arc pivotally and slidably connected at one end to said observer's meridian arc and carried by the horizon and azimuth arc and bodily movable with the horizon and azimuth arc to and from an elevated position relative to said base.

2. An instrument of the class described comprising a support, a transparent dome-like member rotatably mounted upon the support, the dome-like member having star location designations properly located thereon, an observer's meridian arc pivotally mounted adjacent the dome-like member and movable across one face of the transparent dome-like member, said observer's meridian arc being graduated in degrees, a horizon and azimuth arc pivotally mounted with respect to the dome-like member and at right-angles to the observer's meridian arc, an altitude and polar distance arc pivotally and slidably mounted at one end upon the observer's meridian arc and engaging the horizon and azimuth arc at its opposite end, and a leveling means carried by the horizon and azimuth arc.

3. An instrument of the class described comprising a support, a transparent dome-like member rotatably mounted upon the support, the dome-like member having star location designations properly located thereon, an observer's meridian arc pivotally mounted adjacent the dome-like member and movable across one face of the transparent dome-like member, said observer's meridian arc being graduated in degrees, a horizon and azimuth arc pivotally mounted with respect to the dome-like member and at right-angles to the observer's meridian arc, an altitude and polar distance arc pivotally and slidably mounted at one end upon the observer's meridian arc and engaging the horizon and azimuth arc at its opposite end, a leveling means carried by the horizon and azimuth arc, an index slide slidably mounted upon the altitude and polar distance arc and said altitude and polar distance arc being graduated throughout its length, the altitude and polar distance arc being adapted to bodily move with the horizon and azimuth arc and being adapted to swing laterally with respect to said observer's meridian arc.

4. An instrument of the class described comprising a support, a transparent dome-like member rotatably mounted upon the support, the dome-like member having star location designations properly located thereon, an observer's meridian arc pivotally mounted adjacent the dome-like member and movable across one face of the transparent dome-like member, said observer's meridian arc being graduated in degrees, a horizon and azimuth arc pivotally mounted with respect to the dome-like member and at right-angles to the observer's meridian arc, an altitude and polar distance arc pivotally and slidably mounted at one end upon the observer's meridian arc and engaging the horizon and azimuth arc at its opposite end, a leveling means carried by the horizon and azimuth arc, said dome-like member being formed of a plurality of segments movable from a substantially horizontal to a dome-formation position.

5. An instrument of the class described comprising a support, a transparent dome-like member rotatably mounted upon the support, the dome-like member having star location designations properly located thereon, an observer's meridian arc pivotally mounted adjacent the dome-like member and movable across one face of the transparent dome-like member, said observer's meridian arc being graduated in degrees, a horizon and azimuth arc pivotally mounted with respect to the dome-like member and at right-angles to the observer's meridian arc, an altitude and polar distance arc pivotally and slidably mounted at one end upon the observer's meridian arc end engaging the horizon and azimuth arc at its opposite end, a leveling means carried by the horizon and azimuth arc, said dome-like member being formed of a plurality of segments movable from a substantially horizontal to a dome-formation position, and means for holding the dome-like member in an extended dome-like form.

6. An instrument of the class described comprising a support, a transparent dome-like member rotatably mounted upon the support, the dome-like member having star location designations properly located thereon, an observer's meridian arc pivotally mounted adjacent the dome-like member and movable across one face of the transparent dome-like member, said observer's meridian arc being graduated in degrees, a horizon and azimuth arc pivotally mounted with respect to the dome-like member and at right-angles to the observer's meridian arc, an altitude and polar distance arc pivotally and slidably mounted at one end upon the observer's meridian arc and engaging the horizon and azimuth arc at its opposite end, a leveling means carried by the horizon and azimuth arc, said dome-like member being formed of a plurality of segments movable from a substantially horizontal to a dome-formation position, the segments having overlapping inner ends slidable one with respect to the other, a connecting pin for holding the inner ends of the segments together, and said pin having means engageable with the observer's meridian arc for fixedly supporting the dome-like member in an extended dome-like form.

7. An instrument of the class described comprising a support, a transparent dome-like member rotatably mounted upon the support, the dome-like member having star location designations properly located thereon, an observer's meridian arc pivotally mounted adjacent the dome-like member and movable across one face of the transparent dome-like member, said observer's meridian arc being graduated in degrees, a horizon and azimuth arc pivotally mounted with respect to the dome-like member and at right-angles to the observer's meridian arc, an altitude and polar distance arc pivotally and slidably mounted at one end upon the observer's meridian arc and engaging the horizon and azimuth arc at its opposite end, a leveling means carried by the horizon and azimuth arc, and a transversely extending sighting strip spanning the diameter of said dome-like member and having a sighting aperture at its center normally located directly under the center of said dome-like member.

8. An instrument of the class described comprising a support, a transparent dome-like member rotatably mounted upon the support, the dome-like member having star location designations properly located thereon, an observer's meridian arc pivotally mounted adjacent the dome-like member and movable across one face of the transparent dome-like member, said observer's meridian arc being graduated in degrees, a horizon and azimuth arc pivotally mounted with respect to the dome-like member and at right-angles to the observer's meridian arc, an altitude and polar distance arc pivotally and slidably mounted at one end upon the observer's meridian arc and engaging the horizon and azimuth arc at its opposite end, a leveling means carried by the horizon and azimuth arc, a transversely extending sighting strip spanning the diameter of said dome-like member and having a sighting aperture at the center normally located directly under the center of said dome-like member, and means carried by said sighting strip movable over said aperture and providing means upon which a ray of light may be cast by the sun when passing through said transparent dome-like member.

9. An instrument of the class described comprising a support, a transparent dome-like member rotatably mounted upon the support, the dome-like member having star location designations properly located thereon, an observer's meridian arc pivotally mounted adjacent the dome-like member and movable across one face of the transparent dome-like member, said observer's meridian arc being graduated in degrees, a horizon and azimuth arc pivotally mounted with respect to the dome-like member and at right-angles to the observer's meridian arc, an altitude and polar distance arc pivotally and slidably mounted at one end upon the observer's meridian arc and engaging the horizon and azimuth arc at its opposite end, a leveling means carried by the horizon and azimuth arc, an index slide slidably mounted upon the altitude and polar distance arc and said altitude and polar distance arc being graduated throughout its length, the altitude and polar distance arc being adapted to bodily move with the horizon and azimuth arc and being adapted to swing laterally with respect to said observer's meridian arc, and a supporting member for said opposite end of the altitude and polar distance arc mounted for slidable movement upon said horizon and azimuth arc and being pivotally connected to one end of said altitude and polar distance arc.

10. An instrument of the class described comprising, a time scale ring and a star calendar ring mounted in concentric and rotatable relation with respect to each other, a semi-spherical collapsible dome formed of a plurality of segments, each segment having an inner and an outer end, means connecting the inner ends of said segments, guiding means for the outer ends of said segments carried by the star calendar ring, the outer ends of said segments being adapted to spread apart radially as the dome is collapsed and thereby permit the dome to lie substantially flat relative to the support when the dome is in a collapsed position, and the dome being adapted to be extended to an approximate semi-spherical shape when in a set-up position.

11. An instrument of the class described having a central point upon which the rays of light from the sun may be cast comprising a transparent globe segment having an ecliptic line thereon and marked with the daily positions of the sun's declination, a support for the globe segment, light-intercepting means carried by the support and movable circumferentially and vertically over the globe segment for intercepting a ray of light cast therethrough upon a selected daily position of the sun's declination as appearing on said ecliptic line on said globe segment, means connected with said support for indicating the central point within said globe segment, a horizon arc carried by the support, a level indicating means carried by said horizon arc, and a movable meridian indicating means extending transversely of said globe element and also substantially conforming to the contour of said globe element and carried by said support, means connecting said light intercepting means with said meridian indicating means, and the position of said movable meridian indicating means being adapted to indicate a north and south line when the sun's rays register with the light-intercepting means, a selected date position on said ecliptic line and said central point when the instrument is in a level position as indicated by said level indicating means.

FREDERICK H. HAGNER.

REFERENCES CITED

The following references are of record in the file of this patent:

UNITED STATES PATENTS

| Number | Name | Date |
|---|---|---|
| 775,364 | Gallagher | Nov. 22, 1904 |
| 2,055,148 | Hagner | Sept. 22, 1936 |
| 2,337,587 | Brocky | Dec. 28, 1943 |
| 2,372,487 | Hagner | Mar. 27, 1945 |

FOREIGN PATENTS

| Number | Country | Date |
|---|---|---|
| 72,041 | Germany | Nov. 20, 1946 |
| 218,527 | Great Britain | July 10, 1924 |